Nov. 10, 1931. R. R. DICKERSON 1,831,763
TOAST BUTTERING DEVICE
Filed Nov. 4, 1929   2 Sheets-Sheet 1
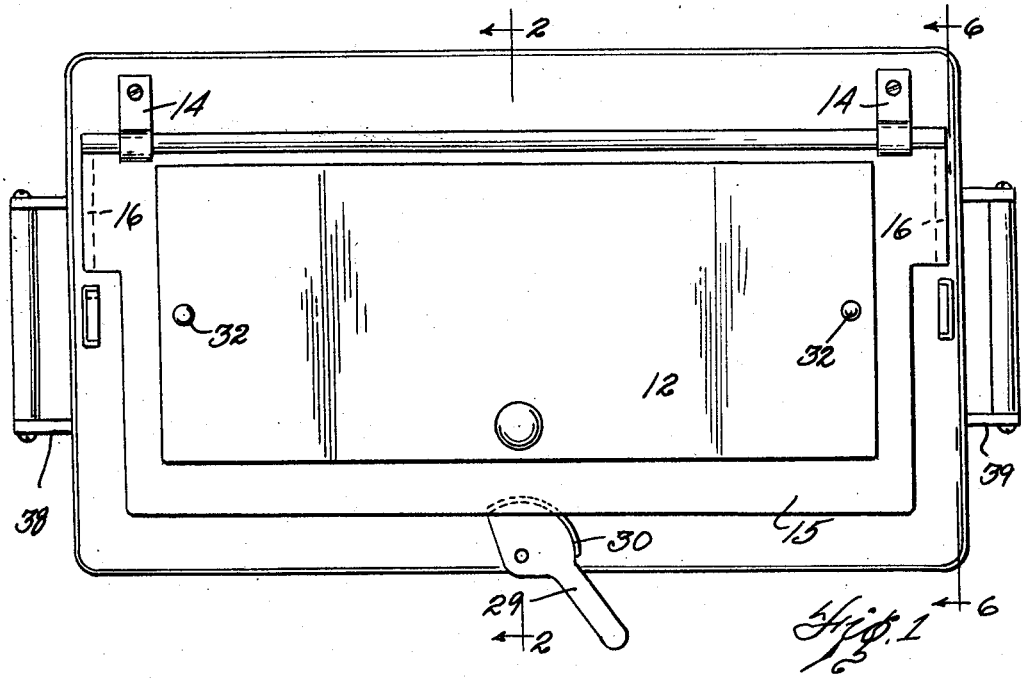
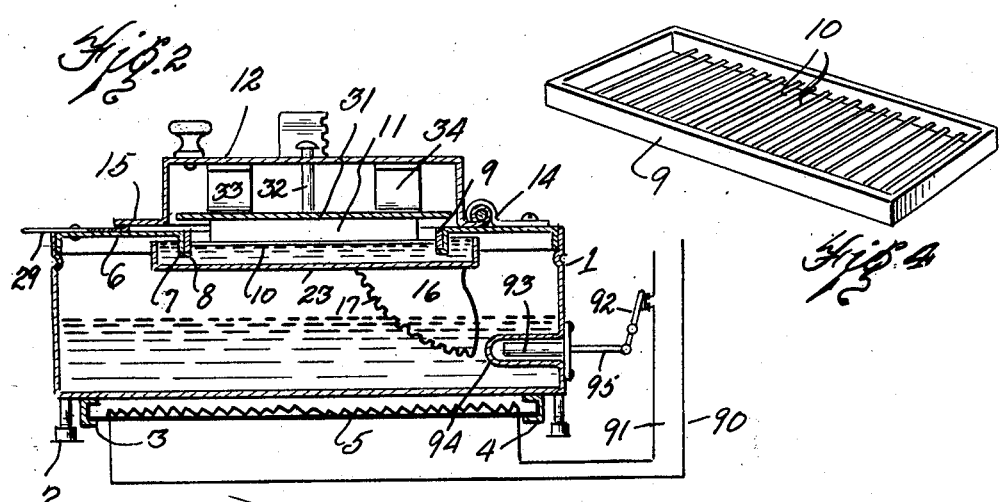
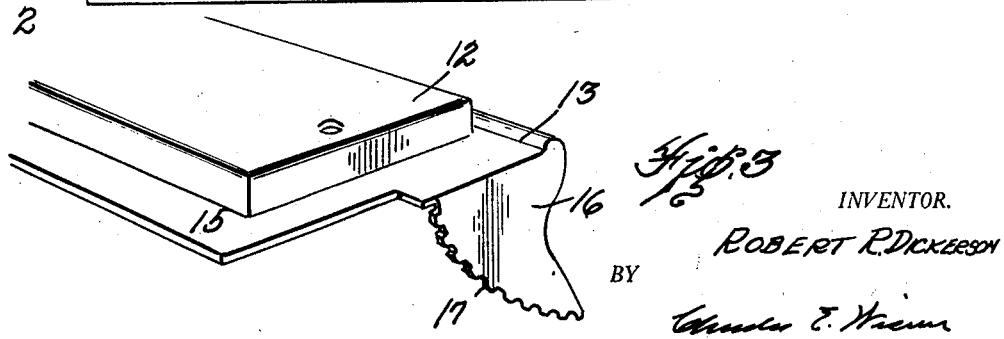
INVENTOR.
ROBERT R. DICKERSON
BY
ATTORNEY.

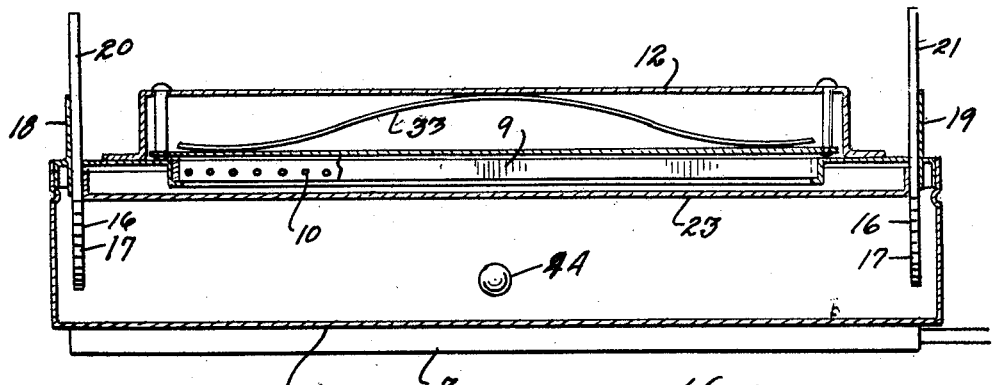

Patented Nov. 10, 1931

1,831,763

UNITED STATES PATENT OFFICE

ROBERT R. DICKERSON, OF YPSILANTI, MICHIGAN, ASSIGNOR, BY DIRECT AND MESNE ASSIGNMENTS, TO DICKERSON BUTTERFASTER COMPANY, OF YPSILANTI, MICHIGAN, A CORPORATION OF MICHIGAN

TOAST BUTTERING DEVICE

Application filed November 4, 1929. Serial No. 404,824.

This invention relates to a device for buttering toast or other similar articles of food, and an object of the invention is to provide a simple and comparatively inexpensive device in which slices of toasted bread for instance may be positioned and by a simple manipulation or a leverage device a surface of the toast be buttered, the arrangement providing that successive pieces of toast may always be buttered to the same degree or varied as to the amount of butter applied as may be desired.

A feature of the construction and an object of the invention is to provide a toast buttering device including a grid on which the toast may be deposited and, by movement of a leverage element, to raise a tray carrying melted butter to contact with one side of the toast.

A further feature of the invention is involved in the means for supporting the toast, bread or other article to be buttered in position on the grid, the construction permitting of various thicknesses of slices of bread, toast or other articles to be buttered to like degree at the same interval.

Further features of the invention are involved in the construction of a toast buttering device in which a receptacle is provided for holding melted butter and thermostatically controlled means for heating the receptacle to maintain the butter in melted condition.

A tray is provided in the receptacle and movable to beneath the surface of the butter in the receptacle when the device is opened to introduce the toast or other article to be buttered and raised upwardly out of the melted butter whereby the level of the butter in the tray is always at the same horizontal line and raised to position to engage the surface of the article to be buttered through movement of the cover member which is provided with means to hold the toast on the grid during the buttering operation.

These and other objects and various novel features of the invention are hereinafter more fully described and claimed, and the preferred form of construction of a toast buttering device embodying my invention is shown in the accompanying drawings in which—

Fig. 1 is a plan view of my improved toast buttering device.

Fig. 2 is a cross section taken on line 2—2 of Fig 1.

Fig. 3 is a detail in perspective of one end of the hinged cover member.

Fig. 4 is a perspective view of a removable grid for supporting the toast.

Fig. 5 is a longitudinal section of the device.

Fig. 6 is a cross section taken on line 6—6 of Fig. 1.

Fig. 7 is a sectional view of an alternative form of construction of the toast supporting device.

Fig. 8 is a sectional view similar to Fig. 6 showing an alternative form of the lower part of the case.

The device in its preferred form consists of a rectangular case 1 of sheet metal, the bottom of which is provided with feet 2 adjustable in length to enable the device to be leveled and also provided with two spaced channels 3 and 4 permitting insertion or removal of an electric heating element 5 of any approved form and connected in any approved manner with an electric circuit. Preferably, as shown in Fig. 2, the circuit for the heating element includes the two wires 90 and 91 and a switch 92 which is operable by means of a thermostatic element 93 positioned in a recess formed in the wall of the receptacle by a tubular portion 94 extending inwardly into the melted butter. This thermostat may be an ether tube, expansion of the ether breaking the switch and contraction closing the switch through movement of a rod 95. By means of the thermostat the butter is maintained at the proper temperature.

This circuit and thermostat also is merely diagrammatically shown in Fig. 2, and it is to be understood may be of any of the various forms of thermostats and heating elements commonly known and adapted to perform the functions herein stated.

The top wall 6 of the casing has a central rectangular aperture as will be understood from Fig. 2 and depending flanges 7 extending thereabout having inturned edges 8. These inturned edges 8 provide a support for a removable grid 9 shown in perspective in Fig. 4 having a series of parallel wires 10 extending from one side of the frame to the other in parallel relation.

When the grid is in place the wires extend across the opening in the top wall 6 below the plane thereof as will be understood from Fig. 2. The grid provides a support for slices 11 of bread, toast or other article to be buttered. In hinged relation with the rear side of this upper wall 6 is a hollow cover member 12 of sheet metal having the rearwardly extending rounded portion 13 hingedly secured in place by the loop like clamps 14 of which there are two shown in Fig. 1. The cover member 12 is provided with a flange 15 extending across the front and both ends thereof over the respective portions of the upper wall 6. The cover member is provided at each of the rear corners of the end flanges with a downwardly extending integral portion 16 having an arcuate toothed periphery 17 as shown more particularly in Figs 2, 3, 5 and 6. The plate 6 at opposite ends is provided with a vertical tubular member 18 and 19 respectively which extend above and below the surface of the plate as shown to receive the respectively vertically movable racks 20 and 21 which are provided with the teeth 22 on the rear edges thereof. These two racks or bars 20 and 21 are respectively fixedly secured at their lower ends to opposite ends of a rectangular tray 23. Also, at each end of the receptacle is provided a gear 24 meshing with the rack teeth 22 of the respective bars 20 and 21 on one side and with the teeth 17 of the member 16 on the opposite side as is shown in Fig. 6. The upper plate or wall 6 of the receptacle is slotted at opposite ends to permit the member 16 on the cover flange to move downwardly or upwardly therethrough in moving the cover member 12 on its hinges.

On the under surface of the plate 6 adjacent the said aperture is a downwardly extending flange 25 having a depending portion 26 apertured to receive one end of the shaft 27 of the respective gear 24, the opposite end of which is supported in the case as will be readily understood. Thus, through turning the cover backwardly to the position shown in Fig. 6 or forwardly to the position shown in Fig. 2, the rack is moved downwardly or upwardly according to the direction of movement of the cover. On the cover being moved downwardly, as shown in Fig. 6, the tray is moved with its upper face below the butter line indicated by dotted lines 28 and becomes filled with the melted butter and on raising the tray therefrom by closing the cover member to position shown in Fig. 2 the tray, level full of butter, is raised to position to engage the under surface of the toast or article supported on the grid. To vary the amount of butter to be applied it is only necessary to vary the extent to which the member 12 is moved downwardly and a convenient means for limiting the distance to which the cover 12 may be so moved consists of a lever 29 pivoted on a vertical axis to the top wall 6 and formed with an upstanding cam like arcuate flange 30, varying in height as will be realized from Fig. 6, to permit the cover to be closed to various distances and thus determine the height to which the butter line of the tray is raised relative to the grid and article placed thereon.

To insure the bread or toast being placed down on the grid properly I provide a plate 31 in the cover 12 having the two headed pins 32 at opposite ends extending through apertures in the cover and leaf springs 33 and 34 are interposed between the upper wall of the cover and the plate 31 tending to yieldingly force the same downwardly. The plate, when an article is on the grid, contacts the upper surface thereof and insures the lower face of the article is properly resting on the grid. An alternative form of this structure is shown in Fig. 7 in which there are three separate spring-pressed plates 35, 36 and 37, there being one for each slice of toast or bread that is to be placed in the device. This number may be varied depending upon the size of the device whereby a more or less number of pieces of toast or like article may be buttered at the same interval. The devices may be provided with the opposite handles 38 and 39 to enable the same to be readily transported.

Although not an essential feature of the invention yet preferably the bottom of the receptacle may be provided with a rectangular filler 70 forming a central rectangular space 71 into which the tray 23 may be moved for the filling operation as shown in Fig. 8. The filler 70 is practically the same in its vertical height as the tray and the arrangement provides a means whereby, even though a comparatively small amount of butter be in the main receptacle, it will be forced upwardly out of the space 71 into the tray as the tray is moved downwardly into the space 71 and thus the receptacle may be practically emptied through operation of the tray.

Also in the preferred construction, the top wall 6 is formed for ready removal from the receptacle in order that the various parts may be thoroughly cleaned. For this purpose I provide the wall 6 with a downwardly extending peripheral flange 72 fitting within the vertical side walls of the receptacle 1. The vertical side walls may be peripherally ribbed in any approved manner as by inward indentation indicated at 73 forming a stop on which the lower edge of the flange 72 may rest. This arrangement provides a fairly close fit between the flange 72 and the side walls of the receptacle and prevents splashing of the melted butter from the receptacle through the interstice between this wall 6 and the receptacle 1 and also due to the flanges 72 being a close fit as stated, the wall 6 is solidly supported whereby manipulation of the cover member 12 and positioning articles on the grid does not displace the wall 6.

From the foregoing description it is evident that the various objects of the invention are attained by the described construction and that the device is simple and unique in construction and efficient in operation, it being only necessary to raise the cover member 12 to the position shown in Fig. 6 whereby the opening in the upper wall 6 of the casing is made accessible to place the bread or toast on the grid within the opening. The cover member is then turned downwardly to the position shown in Fig. 3 which automatically applies the desired amount of butter to the under faces of toast or bread. It is further to be noted that various changes in the construction of the device may be made without departing from the spirit and scope of the invention as is set forth in the appended claims.

Having thus briefly described my invention, what I claim and desire to secure by Letters Patent of the United States is—

1. In apparatus of the character described, a receptacle of rectangular form having an opening in its upper horizontal wall, said wall being formed with a depending flange, a grid supported thereon below the said wall, a tray vertically reciprocatable in the receptacle, its downward movement immersing the same in the melted butter and its upward movement bringing the tray to position to immerse the grid, said grid providing a means for supporting slices of bread, toast or the like whereby the lower faces thereof are buttered on the upward movement of the tray, means limiting the height to which the tray may raised to thereby predetermine the extent of immersion of the toast or bread in the butter, and means for operating the tray.

2. In apparatus of the character described, a receptacle for melted butter having an opening in its upper horizontal wall, a grid supported below the said opening, a cover member hinged to the receptacle and when in closed position covering the said opening, a tray mounted for vertical movement in the receptacle whereby it may be immersed in the melted butter therein or raised therefrom to immerse the grid, said means including racks at opposite ends of the trays, a gear for each rack, means for rotating the gears by movement of the cover, the arrangement providing that, on raising the cover to provide access to the grid for placing the toast thereon, the tray is immersed in the butter in the receptacle and, on closing the cover, the tray is raised to bring the butter therein to contact with the surface of the bread or toast on the grid, and yieldable means carried by the cover engaging the bread to hold the same in contact with the grid as the cover is moved to closed position.

3. In apparatus of the character described, a receptacle for melted butter having an opening in its upper horizontal wall, a grid supported below the said opening, a cover member hinged to the receptacle and when in closed position covering the said opening, a tray mounted for vertical movement in the receptacle whereby it may be immersed in the melted butter therein or raised therefrom to immerse the grid, said means including racks at opposite ends of the trays, a gear for each rack, means for rotating the gears by movement of the cover, a gear segment for each gear fixed to the cover providing a means whereby the raising of the cover moves the tray downward into the butter in the receptacle and by closing the cover the tray is raised to bring the butter therein in contact with the surface of the bread or toast on the grid, and yieldable means carried by the cover engaging the bread to hold the same in contact with the grid as the cover is moved to closed position.

4. In apparatus of the character described, a receptacle for melted butter, a stationary grid like element supported at approximately the top of the receptacle and adapted to support bread or toast on its upper surface, a receptacle of tray like form adapted to contain melted butter, a hinged member covering the grid, means whereby, in raising the hinged member, the tray is moved downwardly into the liquid to filling position and by lowering the hinged member the tray is raised to bring the melted butter therein to immerse the grid and contact the surface of the bread or toast on the grid.

5. In apparatus of the character described, a stationary, flat, grid like element for loosely supporting several articles, such as bread or toast to be buttered, a receptacle of tray like form adapted to contain melted butter, and means for moving the tray relative to the grid whereby a surface of the article to be buttered is caused to be immersed to a definite extent in the melted butter of the receptacle.

6. In apparatus of the character described, a stationary, flat, grid like element for the support of an article such as bread or toast to be buttered, a spring-pressed plate movable to engage the bread or toast to hold the same in contact with the grid, a receptacle of tray like form adapted to contain melted butter, means whereby a certain level of fluid butter may be provided in the receptacle, and means whereby in moving the plate to engage the bread or toast the tray is moved to bring the butter level therein to a predetermined relation with the opposite side of the toast.

7. In apparatus of the character described, a receptacle for melted butter, a tray arranged to be immersed in the butter to fill the same and withdrawn therefrom, supporting means for the articles to be buttered including a stationary grid on which the articles may be placed, and means for holding the articles in contact with the grid, means for moving the tray, the parts being so arranged that upon completion of the withdrawal movement of the tray the surface of the article engaging the grid is contacted by the melted butter in the tray.

8. In apparatus of the character described, a receptacle for melted butter, a tray having a substantially vertical peripheral flange and being movable downwardly into and upwardly from the butter, a stationary, flat, grid on which toast or the like to be buttered may be placed, said tray in its upward movement bringing the butter level of the tray to the surface of the articles positioned on the grid, said grid extending downwardly into the receptacle from the upper portion thereof and said tray being of a size to enclose the entire grid.

9. In apparatus of the character described, a receptacle for containing melted butter, a tray movable vertically in the receptacle to immerse the same in the liquid therein or to raise it upwardly therefrom, means for supporting a slice of toast, bread or the like with the surface thereof to be buttered in position to be engaged by the butter in the tray when raised to uppermost position, said means including a stationary, flat, grid on which the articles to be buttered may be placed, yieldable means for holding the same in contact therewith, and means for varying the extent to which the tray is raised to thereby vary the extent to which the article to be buttered is immersed in the butter carried therein.

10. In a device of the character described, a receptacle for melted butter, a tray having a substantially vertical peripheral flange movable downwardly into and upwardly from the butter, a stationary, flat, grid for loosely supporting several articles to be buttered, the tray at the completion of its upward movement bringing the butter level of the tray to contact with the surface of the articles on the grid, a leverage means for moving the tray, and means engaging the articles to hold the same in contact with the grid as the tray approaches the limit of its upward movement.

11. In a device of the character described, a receptacle for melted butter, the upper horizontal wall of which has an opening, a grid supported below the opening on which articles to be buttered may be placed, a tray movable downwardly into the butter and upwardly therefrom and at the completion of the upward movement bringing the butter of the tray to contact with the surface of the article to be buttered, a cover member in hinged relation with the receptacle, and means whereby the raising of the cover immerses the tray in the butter and the closing of the cover raises the tray.

12. In a device of the character described, a receptacle for melted butter, the upper horizontal wall of which has an opening, a grid supported below the opening on which articles to be buttered may be placed, a tray movable downwardly into the butter and upwardly therefrom and at the completion of the upward movement bringing the butter of the tray to contact with the surface of the article to be buttered, a cover member in hinged relation with the receptacle, means whereby the raising of the cover immerses the tray in the butter and the closing of the cover raises the tray, and means for varying the height to which the tray may be raised.

13. In apparatus of the character described, a receptacle for melted butter, means for maintaining the butter in a melted condition, a tray adapted to be moved to position to be filled with melted butter, a stationary, flat, grid for supporting the articles with the surfaces to be buttered in the same horizontal plane, means for moving the tray to position the level of the butter therein in the desired relationship with the surfaces of the articles to be buttered, and manually adjustable means for determining the position of the level of butter in the tray relative to the surface of the articles to be buttered.

14. In apparatus of the character described, a receptacle for butter, means for maintaining the butter in a melted condition, a second receptacle adapted to be immersed in the fluid to fill the same and to be withdrawn therefrom, manual means for so moving the tray, a stationary, flat, grid like support for the articles by which the surface thereof to be buttered is maintained in the same horizontal plane on the upper surface of the grid, the arrangement being such that in withdrawing the filled tray from the immersed position the surface of the butter therein is moved to position to immerse the grid and to contact the surfaces of the articles thereon.

15. In apparatus of the character described, a receptacle for melted butter, means for maintaining the butter in melted condition, a tray adapted to be moved vertically up and down to immerse the tray in the butter and to raise it therefrom, means for adjusting the device whereby the tray may be positioned in a horizontal plane, a support in the upper part of the receptacle of a character to hold several pieces of bread or toast with the surfaces to be buttered in a horizontal plane, means for raising or lowering the tray, and means for varying the height to which the tray may be raised whereby the extent to which the bread or toast is immersed in the liquid may be determined.

In testimony whereof I sign this specification.

ROBERT R. DICKERSON.